United States Patent
Bhodia et al.

(10) Patent No.: US 11,909,635 B2
(45) Date of Patent: Feb. 20, 2024

(54) HARDWARE-ASSISTED FAST DATA PATH SWITCHOVER FOR A NETWORK DEVICE WITH REDUNDANT FORWARDING COMPONENTS

(71) Applicant: Juniper Networks, Inc., Sunnyvale, CA (US)

(72) Inventors: Dhaval Bakulesh Bhodia, Bangalore (IN); Vyasraj Satyanarayana, Bangalore (IN); Saleem Rahim, Bangalore (IN); Shrish Mahishi, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/193,831

(22) Filed: Mar. 5, 2021

(65) Prior Publication Data
US 2022/0286389 A1 Sep. 8, 2022

(51) Int. Cl.
*H04L 45/00* (2022.01)
*H04L 45/28* (2022.01)
*H04L 45/42* (2022.01)

(52) U.S. Cl.
CPC ........... *H04L 45/566* (2013.01); *H04L 45/22* (2013.01); *H04L 45/28* (2013.01); *H04L 45/38* (2013.01); *H04L 45/42* (2013.01)

(58) Field of Classification Search
CPC ....... H04L 45/566; H04L 45/22; H04L 45/28; H04L 45/38; H04L 45/42
See application file for complete search history.

(56) References Cited

U.S. PATENT DOCUMENTS

| | | | |
|---|---|---|---|
| 6,535,924 B1 * | 3/2003 | Kwok | ................ H04L 69/329 709/242 |
| 6,885,635 B1 | 4/2005 | Haq et al. | |
| (Continued) | | | |

FOREIGN PATENT DOCUMENTS

| | | |
|---|---|---|
| CN | 108989203 A | 12/2018 |
| CN | 110061912 A | 7/2019 |

OTHER PUBLICATIONS

Extended European Search Report for Application No. EP21170984. 5, dated Oct. 27, 2021, 8 pages.

*Primary Examiner* — Glenford J Madamba
*Assistant Examiner* — Dixon F Dabipi
(74) *Attorney, Agent, or Firm* — Harrity & Harrity, LLP

(57) ABSTRACT

A network device may receive packets, wherein the network device includes a first routing component, a second routing component, a first forwarding component, a second forwarding component, and a physical interface card concentrator with multiple physical interface cards. The first routing component may provide, to the physical interface card concentrator, a signal indicating that the second forwarding component is to be an active forwarding component. The physical interface card concentrator may cause, based on the signal, a data path for the multiple physical interface cards to be switched from the first forwarding component to the second forwarding component. The first routing component may provide the packets to the second forwarding component. The second forwarding component may provide the packets to the multiple physical interface cards via the data path. The multiple physical interface cards may forward the packets toward destinations associated with the packets.

20 Claims, 10 Drawing Sheets

(56) References Cited

U.S. PATENT DOCUMENTS

| | | | |
|---|---|---|---|
| 7,406,030 B1* | 7/2008 | Rijsman | H04L 45/00 370/216 |
| 7,519,735 B1 | 4/2009 | Ju et al. | |
| 7,558,270 B1 | 7/2009 | Wilford et al. | |
| 7,808,889 B1* | 10/2010 | Howard | G06F 11/2028 370/217 |
| 7,940,650 B1* | 5/2011 | Sandhir | H04L 45/28 370/219 |
| 8,107,363 B1* | 1/2012 | Saluja | H04L 45/50 370/228 |
| 8,649,256 B2 | 2/2014 | Haq et al. | |
| 8,943,489 B1* | 1/2015 | Qu | G06F 8/656 717/172 |
| 9,621,421 B1* | 4/2017 | Tolentino | H04L 43/16 |
| 10,389,635 B2 | 8/2019 | Jeganathan et al. | |
| 10,680,944 B2 | 6/2020 | Mahishi | |
| 2007/0162565 A1* | 7/2007 | Hanselmann | H04L 45/60 709/219 |
| 2011/0103220 A1* | 5/2011 | Haq | H04L 1/22 370/216 |
| 2011/0235638 A1* | 9/2011 | Tempia Bonda | H04L 45/028 370/390 |
| 2015/0229387 A1* | 8/2015 | Chiu | H04Q 11/0066 398/5 |
| 2017/0053258 A1* | 2/2017 | Carney | H04L 45/306 |

* cited by examiner

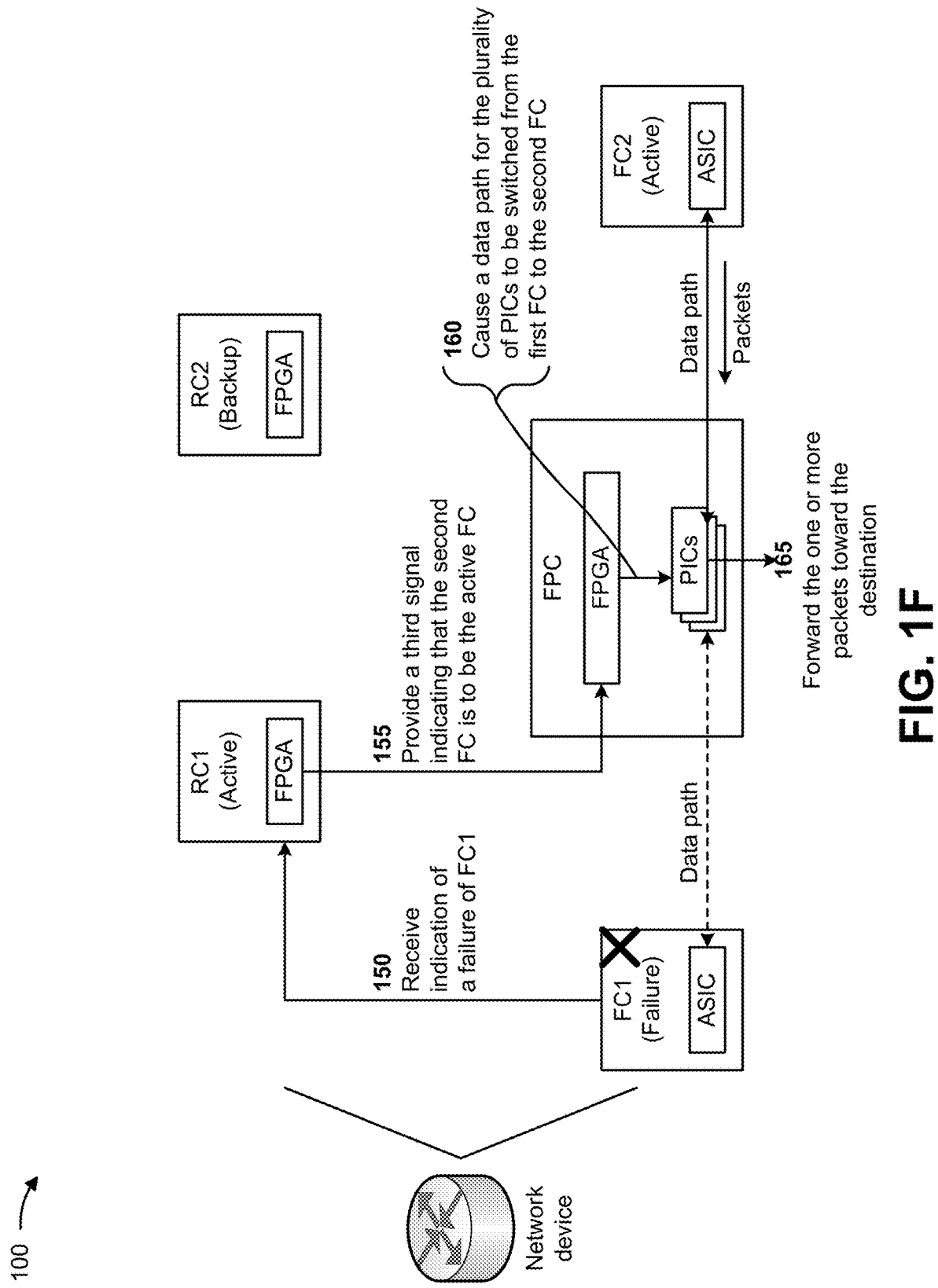

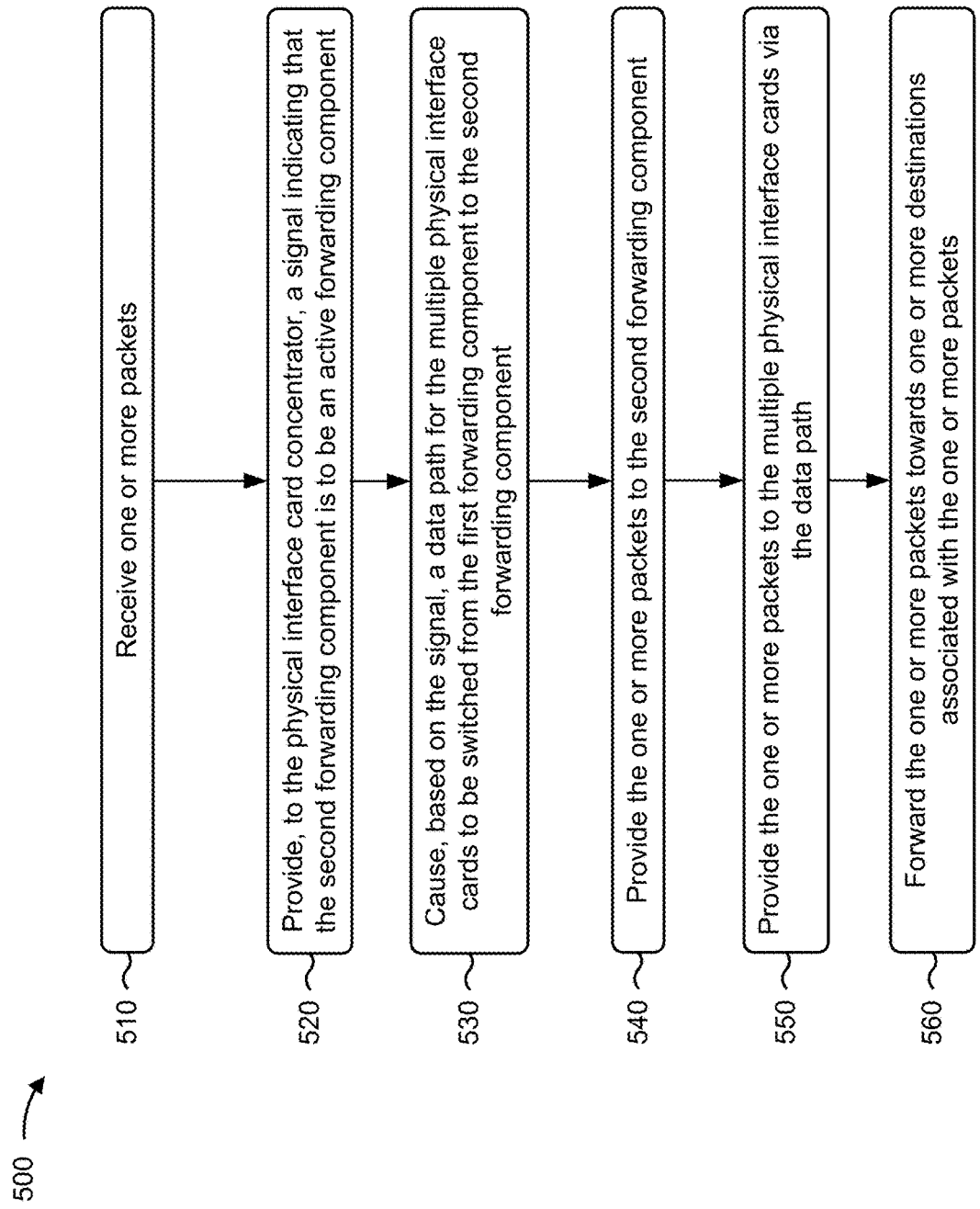

HARDWARE-ASSISTED FAST DATA PATH SWITCHOVER FOR A NETWORK DEVICE WITH REDUNDANT FORWARDING COMPONENTS

BACKGROUND

Some network devices may include a hardware architecture that is useful for various applications, such as data centers, a local area network (LAN) of different organizations, and service provider aggregation deployment. Such applications may require data path redundancy with near zero packet loss.

SUMMARY

In some implementations, a method may include receiving, by a network device, one or more packets, wherein the network device includes a first routing component, a second routing component, a first forwarding component, a second forwarding component, and a physical interface card concentrator with multiple physical interface cards. The method may include providing, by the first routing component and to the physical interface card concentrator, a signal indicating that the second forwarding component is to be an active forwarding component, and causing, by the physical interface card concentrator and based on the signal, a data path for the multiple physical interface cards to be switched from the first forwarding component to the second forwarding component. The method may include providing, by the first routing component, the one or more packets to the second forwarding component, and providing, by the second forwarding component, the one or more packets to the multiple physical interface cards of the physical interface card concentrator via the data path. The method may include forwarding, by the multiple physical interface cards, the one or more packets toward one or more destinations associated with the one or more packets.

In some implementations, a network device may include a first routing component; a second routing component; a first forwarding component; a second forwarding component; and a physical interface card concentrator with multiple physical interface cards. The first routing component may be configured to provide, to the physical interface card concentrator, a signal indicating that the second forwarding component is to be an active forwarding component, and provide one or more packets to the second forwarding component. The physical interface card concentrator may be configured to cause, based on the signal, a data path for the multiple physical interface cards to be switched from the first forwarding component to the second forwarding component. The second forwarding component may be configured to provide the one or more packets to the multiple physical interface cards of the physical interface card concentrator via the data path. The multiple physical interface cards may be configured to forward the one or more packets toward one or more destinations associated with the one or more packets.

In some implementations, a system may comprise a first routing component; a second routing component; a first forwarding component; a second forwarding component; and a plurality of physical interface cards. The first routing component is configured to provide a signal indicating that the second forwarding component is to be an active forwarding component and provide one or more packets to the second forwarding component. Based on the signal, a data path for the physical interface cards may be switched from the first forwarding component to the second forwarding component. The second forwarding component may be configured to provide the one or more packets to the physical interface cards via the data path. The plurality of physical interface cards may be configured to forward the one or more packets toward one or more destinations associated with the one or more packets, receive one or more additional packets, and provide the one or more additional packets to the second forwarding component to cause the second forwarding component to provide the one or more additional packets to the first routing component.

BRIEF DESCRIPTION OF THE DRAWINGS

FIGS. 1A-1F are diagrams of an example implementation associated with switchover for a network device with redundant forwarding components.

FIG. 5 is a flowchart of an example process for switchover for a network device with redundant forwarding components.

DETAILED DESCRIPTION

Figure 1A:
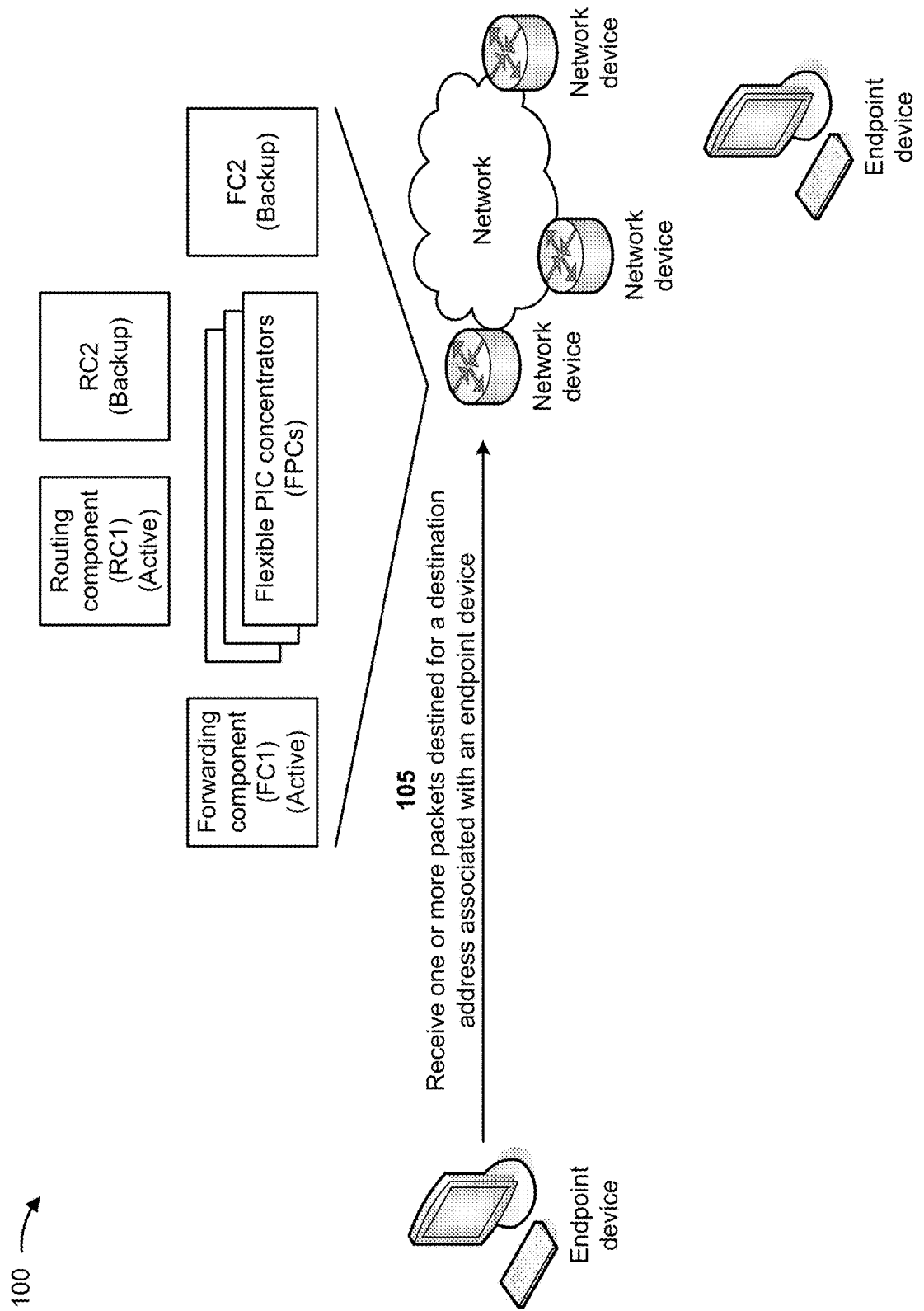

The following detailed description of example implementations refers to the accompanying drawings. The same reference numbers in different drawings may identify the same or similar elements.

Data path redundancy may be utilized to address hardware failures, software failures, software upgrades, among other examples of events that may disrupt an operation of a network device. Data path redundancy may be achieved in the network device by using two routing components and two forwarding components. The network device may also include multiple flexible physical interface card concentrators (FPCs) and each FPC may include multiple physical interface card (PICs). The network device may establish data paths between the PICs and the forwarding components. One of the forwarding components may be an active forwarding component that forwards traffic (e.g., packets) to the FPCs. Another one of the forwarding components may be a backup forwarding component that forwards the traffic to the FPCs when hardware failures and/or software failures are detected with respect to the active forwarding component.

The PICs may receive the traffic from the active forwarding component and may forward the traffic toward destinations associated with the traffic. The PICs may also broadcast traffic received by the network device to the active forwarding component and the backup forwarding component. During a switchover from the active forwarding component to the backup forwarding component, the PICs on each of the FPCs need to switch and select traffic from the backup forwarding component (e.g., which has become the new active forwarding component).

With respect to current switchover techniques, each of the PICs need to be updated (in a serial manner) with information identifying the new active forwarding component after the switchover, new data paths between the new active forwarding component and the PICs need to be reestablished after the switchover, and control paths need to be reestablished between the new active forwarding component and the PICs. Thus, current switchover techniques are subject to latency and delays. Such switchover latency and delays may result in the network device experiencing packet loss.

The switchover latency and delays along with packet loss are exacerbated as the quantities of FPCs and/or PICs (of the network device) increase. Thus, current switchover techniques waste computing resources (e.g., processing resources, memory resources, communication resources, and/or the like), network resources, and/or other resources associated with detecting packet loss, causing retransmission of packets due to packet loss, reconfiguring the network device to mitigate packet loss, among other examples of actions to mitigate packet loss.

Some implementations described herein relate to a network device that provides switchover for redundant forwarding components of the network device. For example, the network device may receive one or more packets, wherein the network device includes a first routing component, a second routing component, a first forwarding component, a second forwarding component, and a physical interface card concentrator (FPC) with multiple physical interface cards (PICs). The network device may provide, by the first routing component and to the physical interface card concentrator, a signal indicating that the second forwarding component is to be an active forwarding component, and may cause, by the physical interface card concentrator and based on the signal, a data path for the multiple physical interface cards to be switched from the first forwarding component to the second forwarding component. The network device may provide, by the first routing component, the one or more packets to the second forwarding component, and may provide, by the second forwarding component, the one or more packets to the multiple physical interface cards of the physical interface card concentrator via the data path. The network device may forward, by the multiple physical interface cards, the one or more packets toward one or more destinations associated with the one or more packets.

As explained herein, a routing component (of the network device) may generate a first signal and may provide the first signal to all of the FPCs of the network device. The first signal may be generated based on a detected failure (e.g., a hardware failure or a software failure) of a current active forwarding component and/or based on a detected failure (e.g., a hardware failure or a software failure) of another routing component. This implementation can be extended further to monitor individual components on the current active forwarding component. The first signal may include information identifying a new active forwarding component of the network device and/or information identifying the routing component as an active routing component of the network device.

Based on the first signal, the FPCs may generate a second signal and provide the second signal to the PICs (of the FPCs) to cause the PICs to simultaneously switch data paths to the new active forwarding component. In other words, all the PICs on all the FPCs may switch data path at once using a single software write operation or an automatic hardware triggered operation on the active routing component. Providing the first signal and the second signal enables separation of data path and control path fail over communication. The implementations described herein enable software planned events to trigger data path switchover in an efficient and seamless manner. The implementations described herein also enable quick switchover schemes that enable near zero packet loss in almost all switchover scenarios. The selection of the activate forwarding component using the first signal enable flexible deployment with respect to a routing component and a forwarding component that are paired (e.g., associated with each other) or with respect to a routing component and a forwarding component that are independent one from another.

Causing the PICs to simultaneously switch data paths to the new active forwarding component reduces switchover latency and delays. Causing the PICs to simultaneously switch data paths also reduces packet loss on switchover to the new active forwarding component. Accordingly, the network device may conserve computing resources, network resources, and/or other resources that would have otherwise been consumed by detecting packet loss, causing retransmission of packets due to packet loss, reconfiguring the network device to mitigate packet loss, among other examples.

FIGS. 1A-1F are diagrams of an example implementation 100 associated with switchover for a network device with redundant forwarding components. As shown in FIGS. 1A-1F, example implementation 100 includes endpoint devices associated with a network that includes multiple network devices. Each of the endpoint devices may include a wireless communication device, a mobile phone, a laptop computer, a tablet computer, a desktop computer, among other examples, as described herein. Each of the network devices may include a router, a gateway, a switch, a firewall, a hub, a bridge, a reverse proxy, among other examples. Although FIGS. 1A-1F describe a network device interacting with a single endpoint device, in some implementations, the network device may interact with multiple endpoint devices in a similar manner.

As shown in FIG. 1A, and by reference number 105, a network device may receive one or more packets destined for a destination address associated with an endpoint device. For example, the network device may receive the one or more packets from a first endpoint device and the one or more packets may be destined for a destination address of a second endpoint device. The destination address may include a network address, an Internet protocol address, among other examples. In some examples, the network device may receive the one or more packets as part of a session between the first endpoint device and the second endpoint device.

In some implementations, the network device may include a first routing component (RC1), a second routing component (RC2), a first forwarding component (FC1), a second forwarding component (FC2), and a plurality of flexible physical interface card concentrators (FPCs). In some examples, the first routing component may be an active routing component of the network device and the second routing component may be a backup routing component of the network device in the event of a failure of the active routing component (or vice versa).

The active routing component may be configured to communicate with components of the network device (e.g., the first forwarding component, the second forwarding component, the plurality of flexible physical interface card concentrators, among other examples), receive and transmit routing information, build and maintain routing data structures (e.g., routing tables), among other examples of control functions and/or management functions for the network device. In some implementations, each of the first routing component and the second routing component may include a control unit. In some examples, the control unit may include a central processing unit (CPU), a field-programmable gate array (FPGA), an application-specific integrated circuit (ASIC), among other examples.

In some examples, the first forwarding component may be an active forwarding component of the network device and the second forwarding component may be a backup forwarding component of the network device (or vice versa). The active forwarding component may be configured to forward packets (e.g., received at one or more ports of the network device) to the active routing components or to cause packets to be forwarded toward one or more destinations of the packets. In some implementations, each of the first forwarding component and the second forwarding component may include a control unit. In some examples, the control unit may include a CPU, an FPGA, an ASIC, among other examples.

A flexible physical interface card concentrator (or physical interface card concentrator) (FPC) may be a component that includes a control unit and multiple physical interface cards (PICs). In some examples, the control unit may include a CPU, an FPGA, an ASIC, among other examples. The control unit may cause the PICs to establish a data path with the first forwarding component when the first forwarding component is the active forwarding component of the network device or with the second forwarding component when the second forwarding component is the active forwarding component. In some implementations, the PICs may receive the one or more packets and provide the one or more packets to the first forwarding component (e.g., the active forwarding component). The first forwarding component may provide the one or more packets to the first routing component.

Assume that the first routing component is the active routing component of the network device, that the second routing component is the backup routing component of the network device, that the first forwarding component is the active forwarding component of the network device, and that the second forwarding component is the backup forwarding component of the network device. Further assume that the FPCs (e.g., the control units of the FPCs) and the PICs (of the FPCs) have been updated with information indicating that the first forwarding component is the active forwarding component of the network device and that the second forwarding component is the backup forwarding component of the network device. Further assume that a data path (e.g., an active data path) has been established between the first forwarding component and each of the PICs of the plurality of FPCs.

Figure 1B:
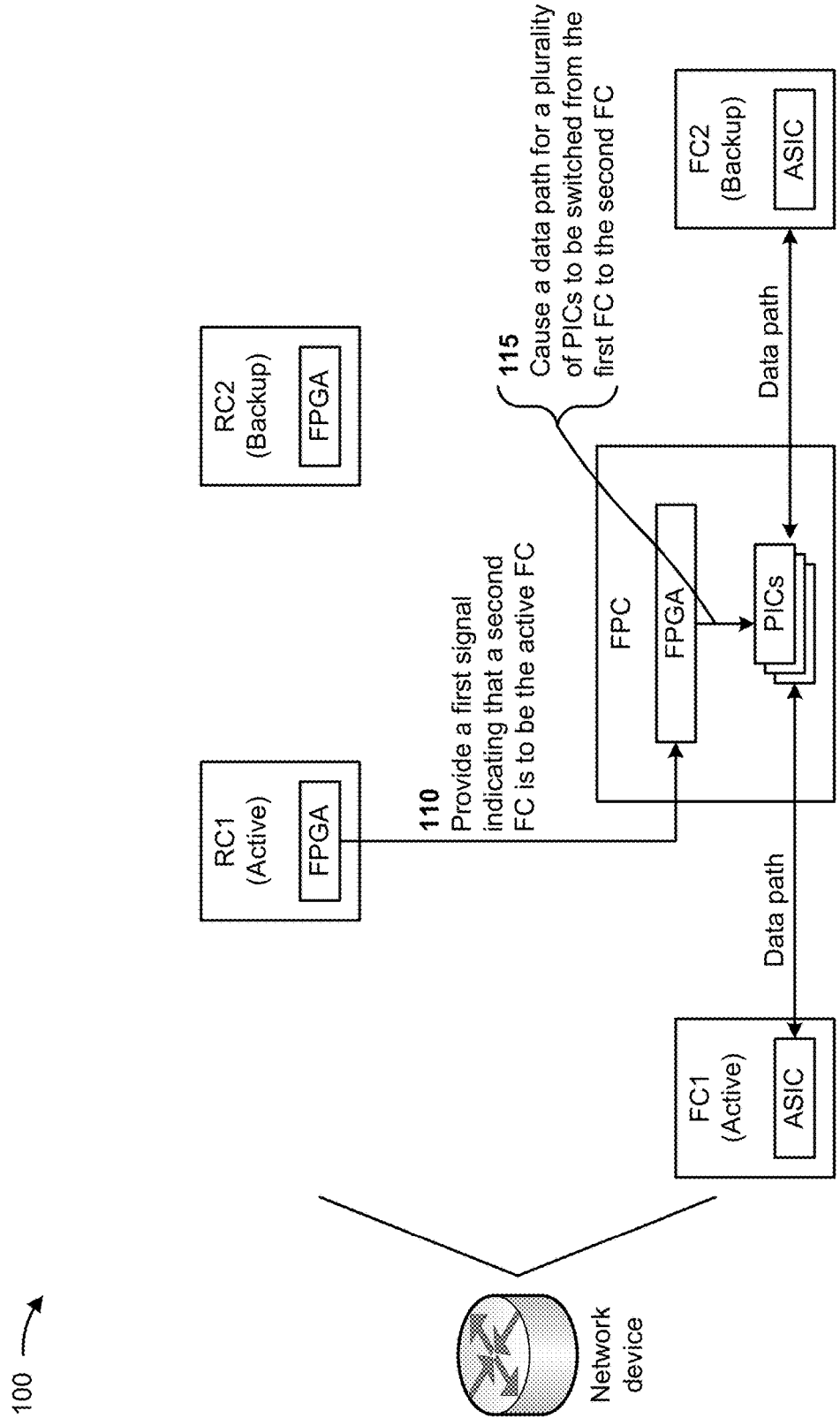

As shown in FIG. 1B, and by reference number 110, the network device may provide a first signal indicating that a second forwarding component is to be the active forwarding component. For example, the first routing component may provide, to an FPC of the network device, the first signal indicating that the second forwarding component is to become the active forwarding component. In some implementations, the first routing component may receive an indication of a switchover from the first forwarding component to the second forwarding component (e.g., to cause the second forwarding component to become the active forwarding component). In some examples, the indication of the switchover may be received based on a re-configuration of the network device (e.g., by an administrator of the network device). As an example, the administrator may be performing an upgrade of the network device (e.g., a software upgrade). The indication of the switchover may be received independent of the first forwarding component experiencing a failure (e.g., received without the first forwarding component experiencing a failure).

The first routing component (e.g., the control unit of the first routing component) may generate the first signal indicating that the second forwarding component is to become the active forwarding component based on the indication of the switchover. In some examples, the first routing component may be updated with information indicating that the second forwarding component is the active forwarding component. Assume that, prior to updating the information, the first routing component was associated with the first forwarding component. After updating the information, the first routing component may be associated with the second forwarding component (instead of being associated with the first forwarding component). As part of updating the information, one or more instructions of the control unit of the first routing component may be updated (e.g., software write) to cause the second forwarding component to be selected as the active forwarding component. In some examples, as a result of updating the information, the first routing component (e.g., the control unit of the first routing component) may generate and provide the first signal to the FPC (e.g., to the control unit of the FPC).

In some implementations, in addition, or alternatively, to the first signal indicating that the second forwarding component is to become the active forwarding component, the first signal may indicate that the first routing component is the active routing component of the network device, that the first routing component is operational, and/or that the second routing component is the backup routing component of the network device. Alternatively, the first routing component may generate and provide (to the FPC) a signal indicating that the first routing component is the active routing component of the network device, a signal indicating that the first routing component is operational, and/or a signal indicating that the second routing component is the backup routing component of the network device in addition to the first signal. The first routing component may provide the first signal (or signals) to one or more other FPCs of the network device in a similar manner.

As shown in FIG. 1B, and by reference number 115, the network device may cause a data path for a plurality of PICs to be switched from the first forwarding component to the second forwarding component. For example, the FPC (e.g., using the control unit of the FPC) may receive the first signal and may cause, based on the first signal, the data path (e.g., the active data path) for each of the PICs (of the FPC) to be switched from the first forwarding component to the second forwarding component. In some implementations, the FPC (e.g., using the control unit of the FPC) may analyze the first signal and determine, based on analyzing the first signal, that the data path for each of the PICs (of the FPC) is to be switched from the first forwarding component to the second forwarding component.

In some examples, based on determining that the data path for each of the PICs is to be switched from the first forwarding component to the second forwarding component, the FPC (e.g., the control unit of the FPC) may be updated with information indicating that the second forwarding component is the active forwarding component. In some implementations, based on determining that the data path for each of the PICs is to be switched from the first forwarding component to the second forwarding component, the FPC (e.g., using the control unit of the FPC) may generate a switch signal indicating that the data path (e.g., the active data path) for each of the PICs (of the FPC) is to be switched from the first forwarding component to the second forwarding component. The FPC (e.g., using the control unit of the FPC) may provide the switch signal to each of the PICs to cause the data path for each of the PICs to be switched from the first forwarding component to the second forwarding component based on the switch signal. In some examples, the FPC may provide the switch signal to the PICs to cause each of the PICs to establish the data path with the second forwarding component as an active data path and cause each of the PICs to maintain the data path with the first forwarding component as a backup data path.

The FPC (e.g., using the control unit of the FPC) may provide the switch signal to each of the PICs to cause the PICs to simultaneously switch the data path from the first forwarding component to the second forwarding component. In some examples, based on receiving the switch signal, the PICs may be updated with information indicating that the second forwarding component is the active forwarding component. Based on updating the information, the PICs may be configured to obtain packets to be transmitted by the network device (e.g., the one or more packets) from the second forwarding component (instead of from the first forwarding component).

In some examples, based on receiving the first signal from the first routing component, the one or more other FPCs (of the network device) may generate and provide a switch signal to respective PICs to cause the respective PICs to simultaneously switch the data path from the first forwarding component to the second forwarding component, in a manner similar to the manner described above. In this regard, each of the PICs (of the FPC and of the one or more other FPCs) may simultaneously switch the data path from the first forwarding component to the second forwarding component based on a single update of the control unit of the first routing component (as described above).

In some implementations, communications (e.g., related to switching data paths) between the first routing component and the FPCs and between the FPCs and the PICs may occur in a timely manner (e.g., occur at clock speed). Accordingly, the network device may reduce (or eliminate) a likelihood of packet loss. By reducing or eliminating the likelihood of packet loss, the network device may conserve computing resources, network resources, and/or other resources that would have otherwise been consumed by detecting packet loss, causing retransmission of packets, reconfiguring the network device to mitigate packet loss, among other examples.

In some implementations, traffic (e.g., packets) may be received at a first port of the network device. The traffic may be provided to one or more first PICs of one or more first FPCs. The one or more first PICs may provide the traffic to the active forwarding component. The active forwarding component may provide the traffic to one or more second PICs of one or more second FPCs. The one or more second PICs may provide the traffic to a second port. The one or more first PICs may be different than or same as the one or more second PICs, the one or more first FPCs may be different than or same as the one or more second FPCs, and/or the first port may be different than or same as the second port. The traffic may be referred to as transit traffic.

Figure 1C:
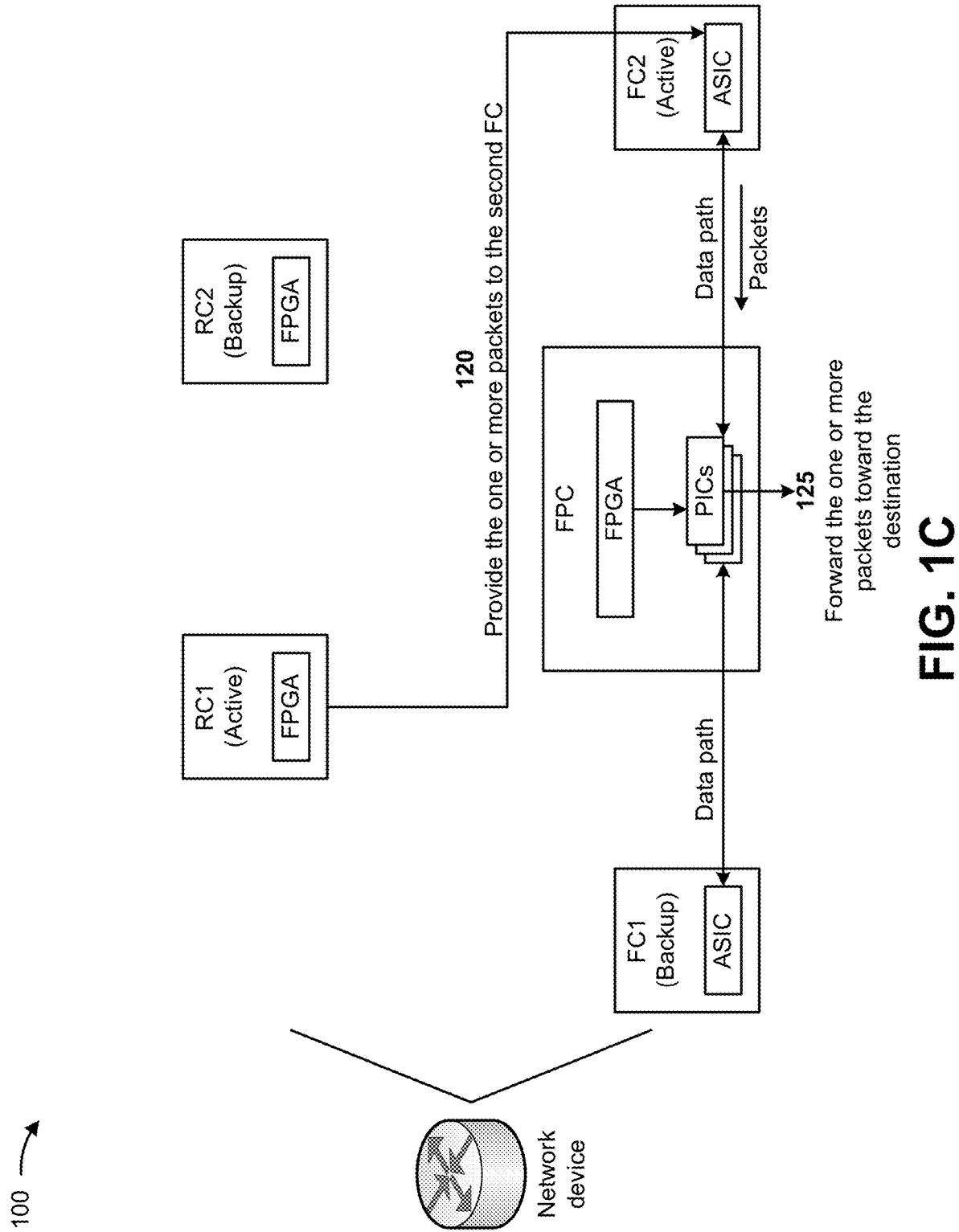

As shown in FIG. 1C, and by reference number 120, the network device may provide the one or more packets to the second forwarding component. For example, the first routing component may cause the one or more packets to be provided to the second forwarding component (instead of the first forwarding component). In some implementations, the first routing component may cause the one or more packets to be provided to the second forwarding component based on receiving the indication of the switchover, based on being updated with the information indicating that the second forwarding component is the active forwarding component, based on the first routing component being associated with the second forwarding component (instead of being associated with the first forwarding component), and/or based on generating and providing the first signal.

As shown in FIG. 1C, and by reference number 125, the network device may forward the one or more packets toward the destination. For example, the second forwarding component may provide the one or more packets to one or more PICs of the PICs of the FPC and the one or more PICs may forward the one or more packets toward the destination of the one or more packets (e.g., forward the one or more packets toward the destination address of the second endpoint device). In some implementations, the one or more PICs may obtain the one or more packets from the second forwarding component via the data path (e.g., the active data path) between the second forwarding component and the one or more PICs.

One or more control units (of the one or more PICs) may cause the one or more PICs to obtain the one or more packets from the second forwarding component via the data path based on the switch signal, based on the information indicating that the second forwarding component is the active forwarding component, among other examples. In some implementations, traffic flowing between the active routing component, the active forwarding component, one or more ports of the network device (via one or more PICs of one or more FPCs) may be referred to as host traffic.

In some implementations, one or more PICs (of the FPC) may receive one or more additional packets (e.g., from the second endpoint device). Based on switching the data path from the first forwarding component to the second forwarding component, the one or more PICs may provide the one or more additional packets to the second forwarding component via the data path. The second forwarding component may provide the one or more additional packets to the first routing component.

As mentioned above, in some implementations, the PICs may maintain the data path between the PICs and the first forwarding component as the redundant data path and establish the data path between the PICs and the second forwarding component as the active data path. Accordingly, in some implementations, the one or more PICs may broadcast the one or more additional packets to the first forwarding component (e.g., via the redundant data path) and to the second forwarding component (e.g., via the active data path). While the foregoing example describes the active routing component interacting with a single FPC, in some implementations, the active routing component may interact with multiple FPCs in a similar manner.

Figure 1D:
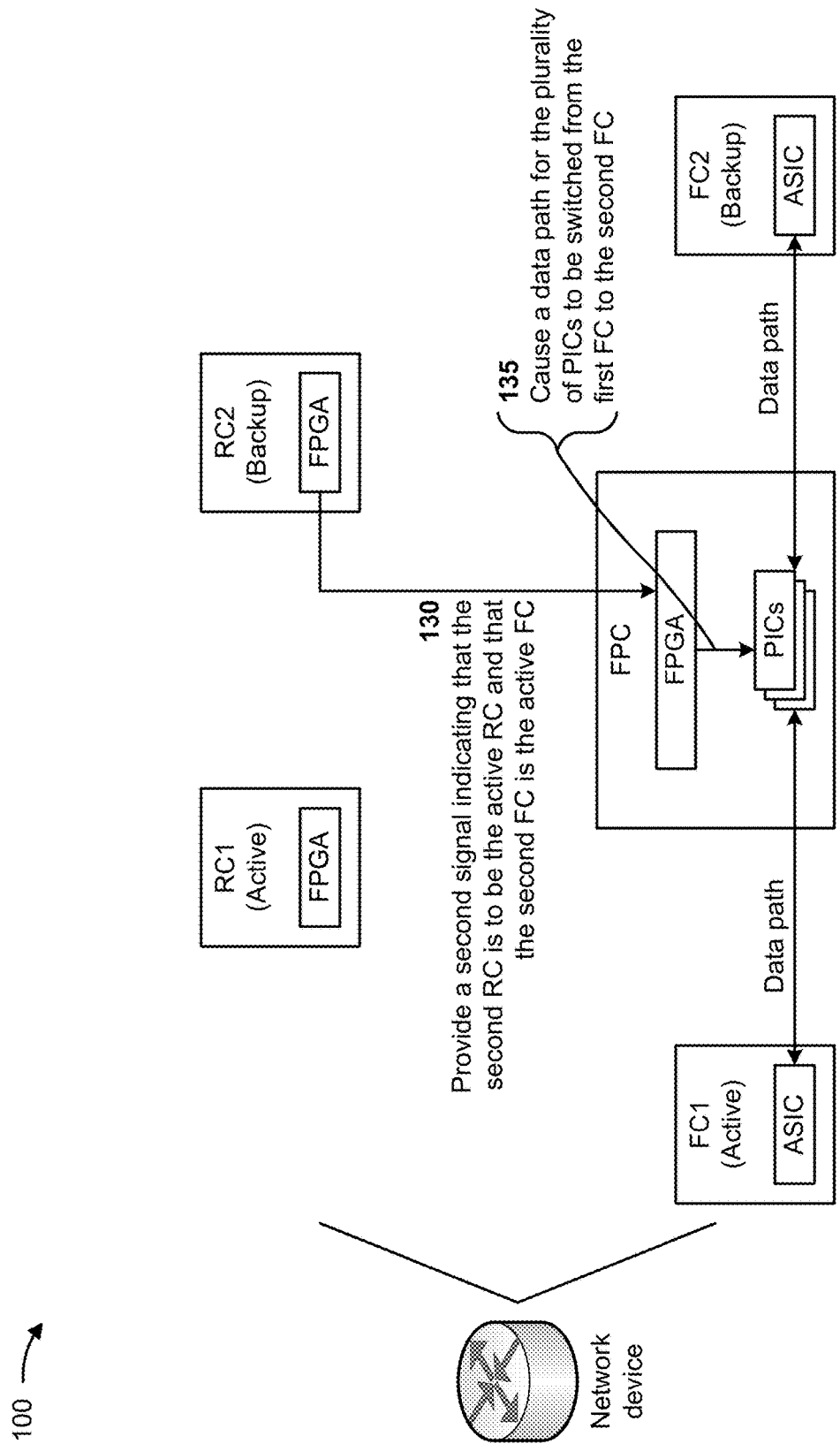
Figure 1E:
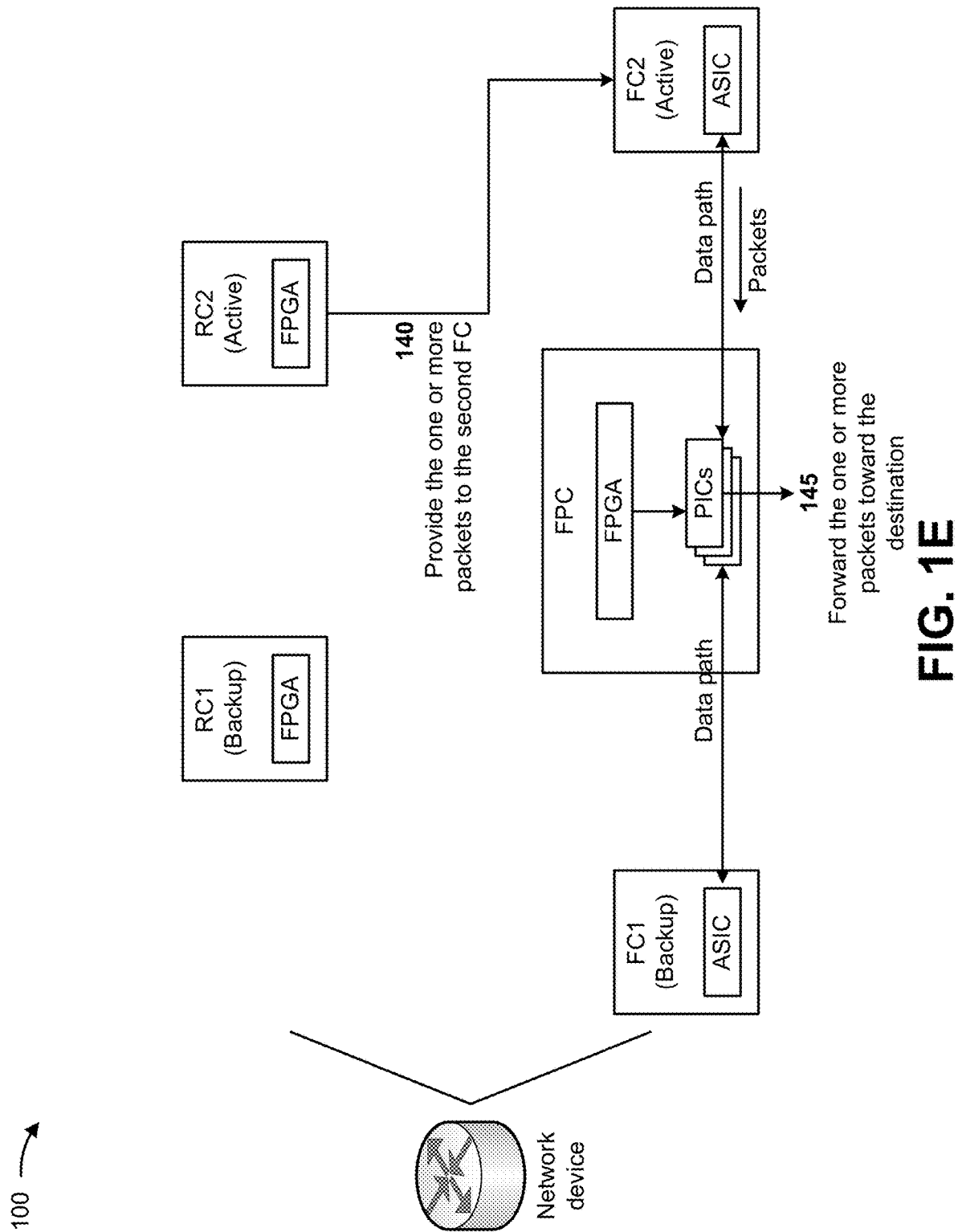

With respect to the FIGS. 1D and 1E, assume that the first routing component is the active routing component of the network device, that the second routing component is the backup routing component of the network device, that the first forwarding component is the active forwarding component of the network device, and that the second forwarding component is the backup forwarding component of the network device.

Further assume that the FPCs (e.g., the control units of the FPCs) have been updated with information indicating the first forwarding component is the active forwarding component of the network device and that the second forwarding component is the backup forwarding component of the network device. Further assume that a data path (e.g., an active data path) has been established between the first forwarding component and each of the PICs of the FPCs. Further assume that the network device has received one or more packets from the first endpoint device in a manner similar to the manner described above in connection with FIG. 1A.

As shown in FIG. 1D, and by reference number 130, the network device may provide a second signal indicating that the second routing component is to be the active routing component and that the second forwarding component is to be the active forwarding component. For example, the second routing component (e.g., the control unit of the second routing component) may provide, to an FPC of the network device, the second signal indicating that the second routing component is the active routing component and that the second forwarding component is to the active forwarding component. In some examples, the second routing component may receive an indication of a switchover from the first routing component to the second routing component. For example, the indication of the switchover may be received based on a re-configuration of the network device (e.g., re-configuration by the administrator of the network device). Additionally, or alternatively, to receiving the indication of the switchover, the second routing component may receive an indication of a failure of the first routing component.

In some implementations, based on receiving the indication of the switchover or the indication of the failure of the first routing component, the second routing component (e.g., the control unit of the second routing component) may determine that the second routing component is to become the active routing component. In some implementations, the second routing component may be associated with the second forwarding component. In some examples, based on the second routing component becoming the active routing component, based on receiving the indication of the switchover, based on the second routing component being associated with the second forwarding component, and/or based on the indication of the failure of the first routing component, the second routing component (e.g., the control unit of the second routing component) may determine that the second forwarding component is to become the active forwarding component.

Based on determining that the second routing component is to become the active routing component and that the second forwarding component is to become the active forwarding component, the second routing component (e.g., the control unit of the second routing component) may generate the second signal and provide the second signal to the FPC. In some examples, the second signal may include information indicating that the second routing component is to become the active routing component and information indicating that the second forwarding component is to become the active forwarding component. The second routing component may cause the second signal to be provided to the FPC in a manner similar described above in connection with FIG. 1B. The signal may cause a simultaneous switchover from the first routing component to the second routing component and from the first forwarding component to the second forwarding component.

As shown in FIG. 1D, and by reference number 135, the network device may cause a data path for the plurality of PICs to be switched from the first forwarding component to the second forwarding component. For example, based on the second signal, the FPC may generate and provide a switch signal to the PICs of the FPC, in a manner similar to the manner described above in connection with FIG. 1B. The switch signal may be provided to the PICs (of the FPC) to cause the data path for each of the PICs to be switched from the first forwarding component to the second forwarding component, in a manner similar to the manner described above in connection with FIG. 1B.

As shown in FIG. 1E, and by reference number 140, the network device may provide the one or more packets to the second forwarding component. For example, the second routing component may cause the one or more packets to be provided to the second forwarding component, in a manner similar to the manner described above in connection with FIG. 1C.

As shown in FIG. 1E, and by reference number 145, the network device may forward the one or more packets toward the destination. For example, the second forwarding component may provide the one or more packets to the PICs (of the FPC) and the PICs may provide the one or more packets toward the destination of the one or more packets, in a manner similar to the manner described above in connection with FIG. 1C.

While the foregoing example describes the active routing component interacting with a single FPC, in some implementations, the active routing component may interact with multiple FPC in a similar manner.

With respect to the FIG. 1F, assume that the first routing component is the active routing component of the network device, that the second routing component is the backup routing component of the network device, that the first forwarding component is the active forwarding component of the network device, and that the second forwarding component is the backup forwarding component of the network device.

Further assume that the FPCs (e.g., the control units of the FPCs) have been updated with information indicating the first forwarding component is the active forwarding component of the network device and that the second forwarding component is the backup forwarding component of the network device. Further assume that a data path (e.g., an active data path) has been established between the first forwarding component and each of the PICs of the FPCs. Further assume that the network device has received one or more packets from the first endpoint device in a manner similar to the manner described above in connection with FIG. 1A.

As shown in FIG. 1F, and by reference number 150, the network device may receive an indication of a failure of the first forwarding component. In some implementations, the first routing component (e.g., the control unit of the first routing component) may actively monitor the first forwarding component and the second forwarding component to determine whether the first forwarding component and/or the second forwarding component are experiencing a failure. For example, the first routing component may monitor the first forwarding component to determine whether the first forwarding component is experiencing a power failure, a clock failure, a failure of the control unit of the first forwarding component, a failure of another component of the first forwarding component, among other examples.

In some implementations, the first routing component may transmit one or more requests to the first forwarding component and determine whether the first forwarding component is experiencing a failure based on whether the first routing component receives one or more responses from the first forwarding component and/or based on information included in the one or more responses. The first routing component (e.g., the control unit of the first routing component) may actively monitor the second forwarding component in a similar manner.

In some implementations, the first routing component may receive an indication of a failure associated with the first forwarding component. In some examples, the failure may be detected by one or more components of the network device (e.g., the first forwarding component, an FPC, a PIC, among other examples) and the indication may be received from the one or more components.

As shown in FIG. 1F, and by reference number 155, the network device may provide a third signal indicating that the second forwarding component is the active forwarding component. In some implementations, the first routing component (e.g., the control unit of the first routing component) may generate the third signal indicating that the second forwarding component is the active forwarding component. For example, the first routing component (e.g., the control unit of the first routing component) may determine that the first forwarding component is experiencing a failure based on receiving the indication of the failure and/or based on the one or more responses (or lack of responses) and may generate the third signal based on determining that the first forwarding component is experiencing the failure.

Additionally, based on determining that the first forwarding component is experiencing a failure, the first routing component may cause the second forwarding component to be selected as the active forwarding component, in a manner similar to the manner described above in connection with FIG. 1B. In some examples, the first routing component may generate and provide the third signal in a manner similar to the manner in which the first routing component generates and provides the first signal, as described above in connection with FIG. 1B.

As shown in FIG. 1F, and by reference number 160, the network device may cause a data path for the plurality of PICs to be switched from the first forwarding component to the second forwarding component. For example, the FPC (e.g., using the control unit of the FPC) may receive the third signal and may cause, based on the third signal, the data path for each of the PICs to be switched from the first forwarding component to the second forwarding component, in a manner similar to the manner described in connection with FIG. 1B. For instance, the FPC may generate and provide a switch signal to the PICs (of the FPC), in a manner similar to the manner described in connection with FIG. 1B. In some examples, the FPC may provide the switch signal to the PICs to cause each of the PICs (of the FPC) to terminate the data path with the first forwarding component (e.g., due to the first forwarding component experiencing a failure) and cause each of the PICs to establish the data path with the second forwarding component.

As shown in FIG. 1F, and by reference number 165, the network device may forward the one or more packets toward the destination. For example, after providing the third signal to the FPCs and/or after the FPC provides the switch signal to the PICs (of the FPC), the first routing component may cause the one or more packets to be provided to the second forwarding component, in a manner similar to the manner described above in connection with FIG. 1C. The second forwarding component may provide the one or more packets to the PICs (of the FPC) and the PICs may provide the one or more packets toward the destination of the one or more packets, in a manner similar to the manner described above in connection with FIG. 1C.

While the foregoing example describes the active routing component interacting with a single FPC, in some implementations, the active routing component may interact with multiple FPC in a similar manner. As explained herein, the PICs (of the network device) may simultaneously switch data paths to the active forwarding component. Accordingly, the network device may conserve computing resources, network resources, and/or other resources that would have otherwise been consumed by detecting packet loss, causing retransmission of packets, reconfiguring the network device to mitigate packet loss, among other examples.

In some implementations, a PIC (of an FPC) may monitor a status of a link (e.g., a physical link of a data path) between the PIC and a forwarding component (e.g., one of the first forwarding component or the second forwarding component). Based on monitoring the status of the link, the PIC may determine whether the link is experiencing a failure (e.g., a failure of the control unit of the forwarding component). Based on determining that the link is experiencing the failure, the PIC may establish a data path with another forwarding component (e.g., another one of the first forwarding component or the second forwarding component).

In some implementations, the control unit of the first routing component and the control unit of the second routing component may encode into the signals (e.g., the first signal, the second signal, and/or the third signal) information indicating a failure of a routing component and/or a forwarding component (e.g., one or more of the first routing component, the second routing component, the first forwarding component, and/or the second forwarding component), a health status of the routing component and/or the forwarding component, a state of the routing component and/or the forwarding component (e.g., offline), a temperature of the routing component and/or the forwarding component, a power status of the routing component and/or the forwarding component, among other examples.

The control unit of an FPC (of the network device) may receive the signal and may decode the information to determine the failure of the forwarding component, the health status of the forwarding component, the state of the forwarding component, the temperature of the routing component and/or the forwarding component, the power status of the routing component and/or the forwarding component, among other examples. The control unit of the FPC may use the decoded information to determine whether the PICs (of the PICs) are to establish a data path with the forwarding component.

In some implementations, the signals (e.g., the first signal, the second signal, and/or the third signal) may be used to perform load balancing for the network device. For example, the active routing component (e.g., the first routing component or the second routing component) may generate a signal to cause the PICs of one or more first FPCs to obtain packets from the first forwarding component and to cause the PICs of one or more second FPCs to obtain packets from the second forwarding component.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
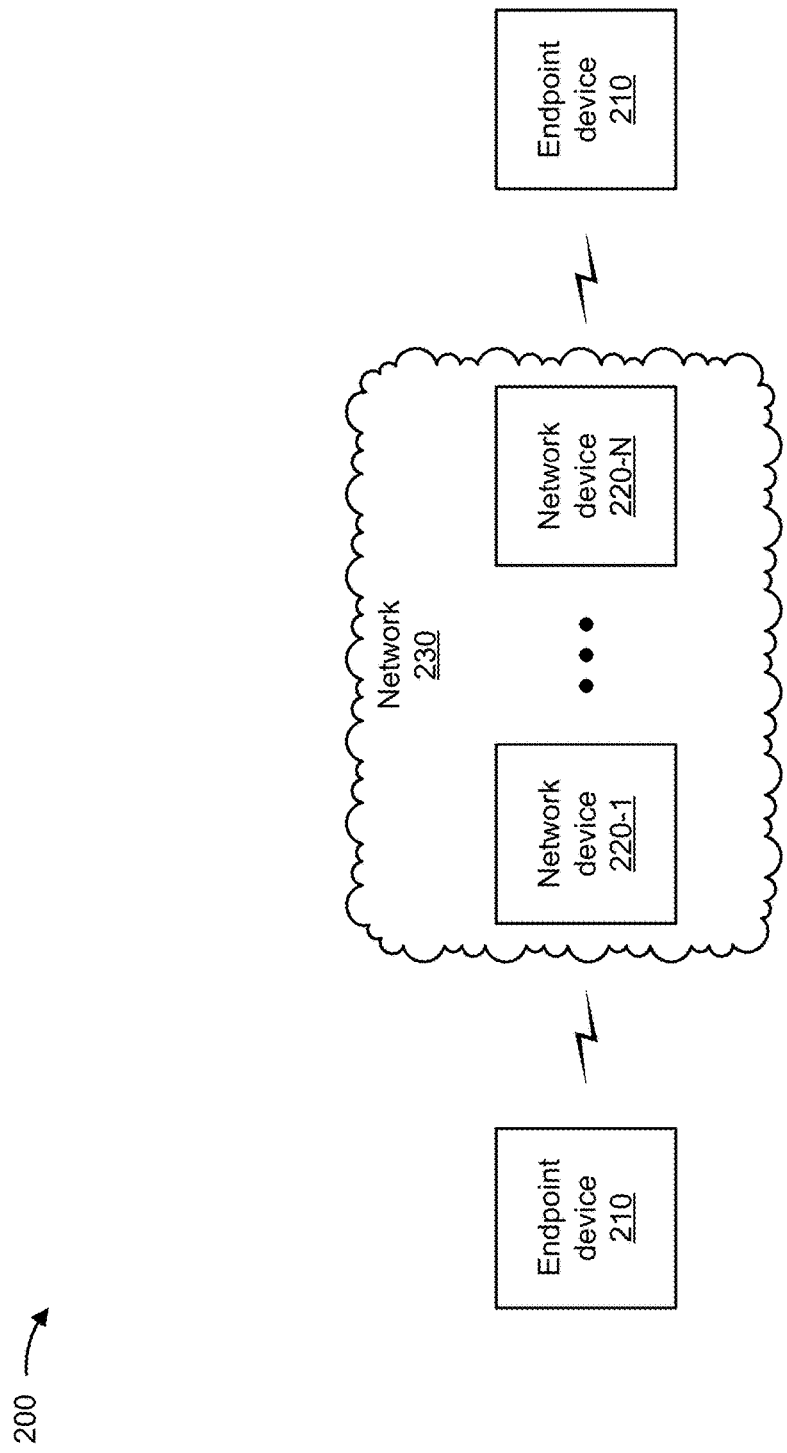
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include endpoint devices 210, a group of network devices 220 (shown as network device 220-1 through network device 220-N), and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, a server device, or a similar type of device. In some implementations, endpoint device 210 may receive network traffic from and/or may provide network traffic to other endpoint devices 210, via network 230 (e.g., by routing packets using network devices 220 as intermediaries).

Network device 220 includes one or more devices capable of receiving, processing, storing, routing, and/or providing traffic (e.g., a packet or other information or metadata) in a manner described herein. For example, network device 220 may include a router, such as a label switching router (LSR), a label edge router (LER), an ingress router, an egress router, a provider router (e.g., a provider edge router or a provider core router), a virtual router, or another type of router. Additionally, or alternatively, network device 220 may include a gateway, a switch, a firewall, a hub, a bridge, a reverse proxy, a server (e.g., a proxy server, a cloud server, or a data center server), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
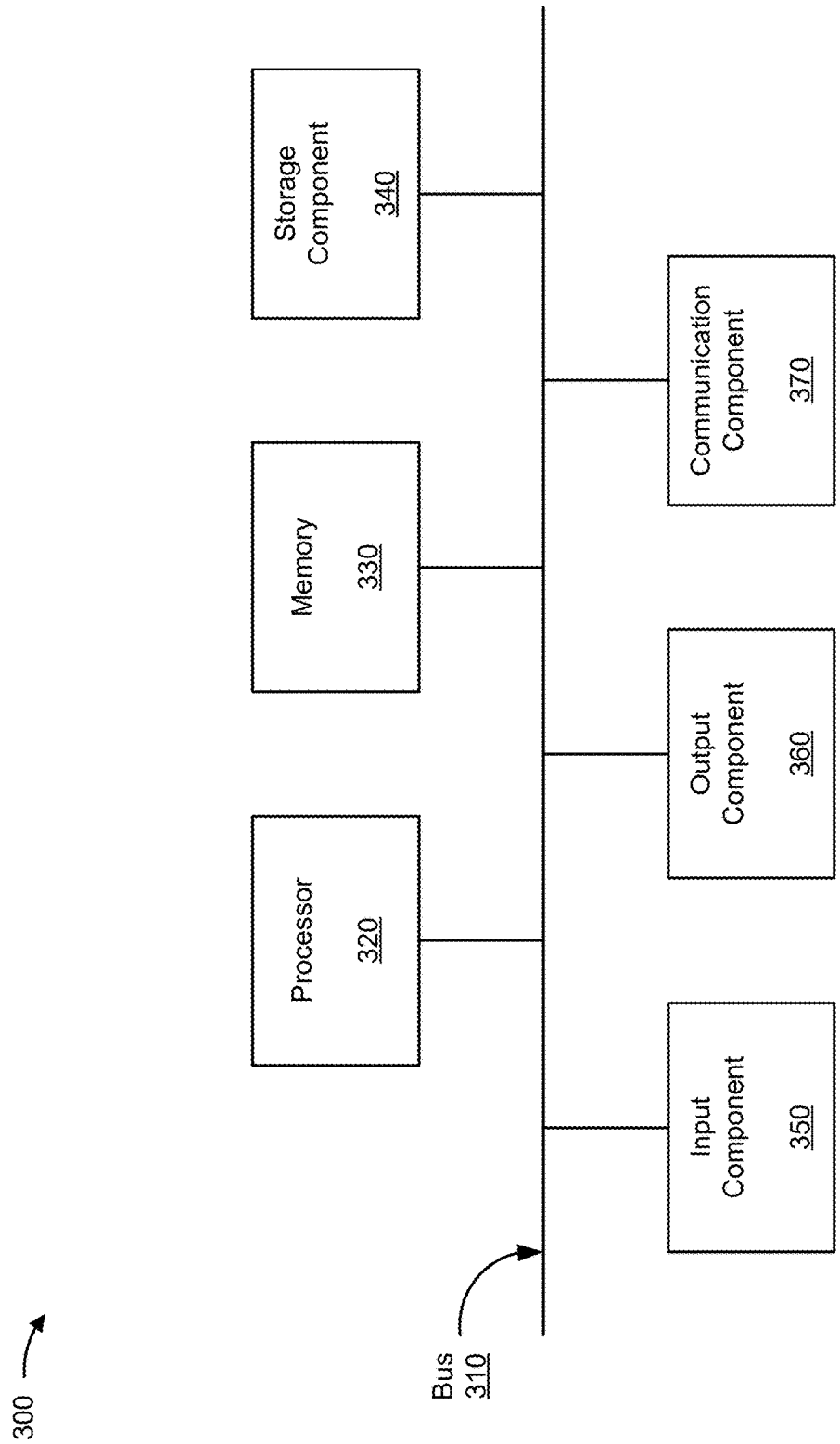
FIG. 3 is a diagram of example components of one or more devices of FIG. 2.

FIG. 3 is a diagram of example components of one or more devices of FIG. 2. The one or more devices may include a device 300, which may correspond to endpoint device 210 and/or network device 220. In some implementations, endpoint device 210 and/or network device 220 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
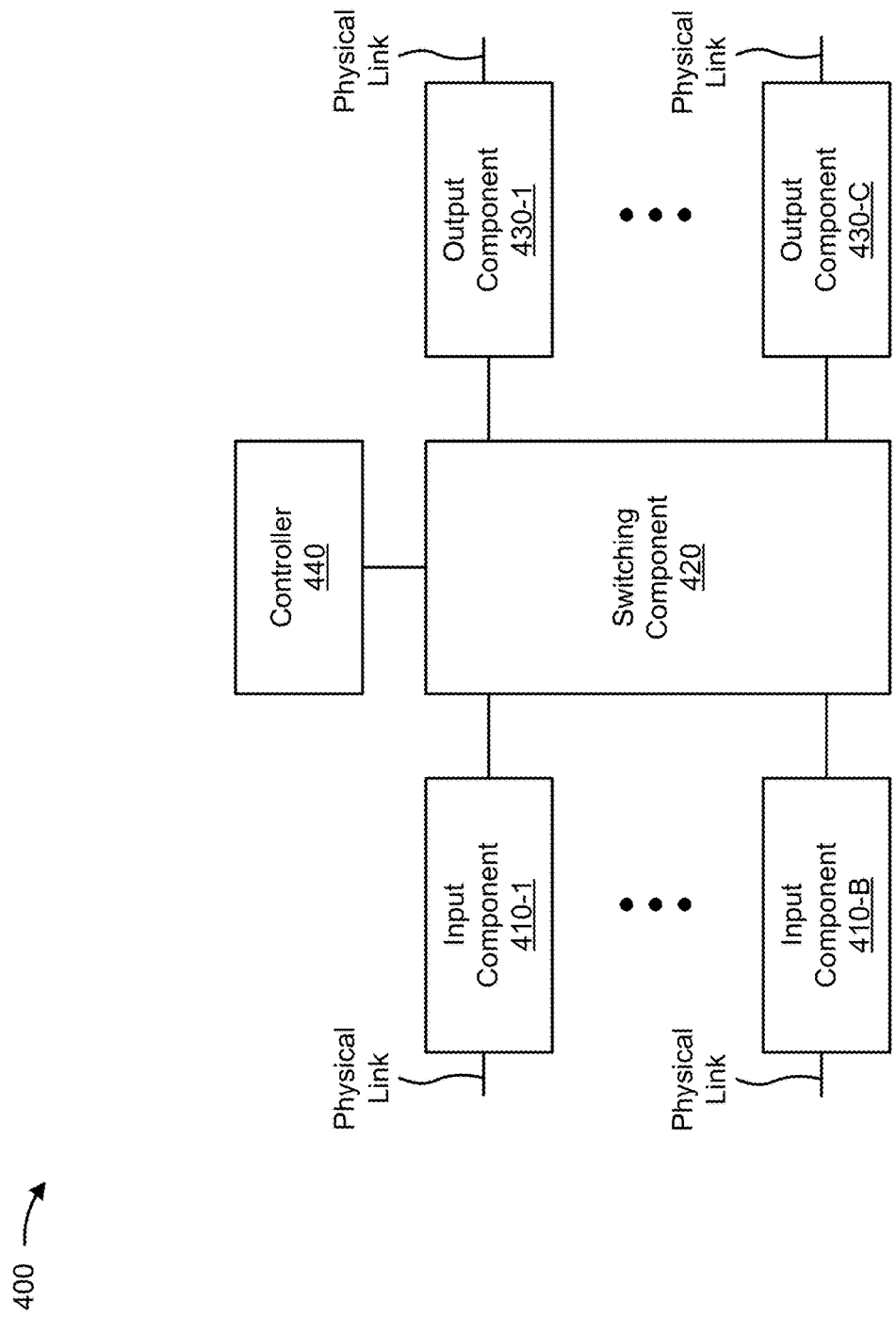
FIG. 4 is a diagram of example components of one or more devices of FIG. 2.

FIG. 4 is a diagram of example components one or more devices of FIG. 2. The one or more devices may include a device 400. Device 400 may correspond to network device 220. In some implementations, network device 220 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 for switchover for a network device with redundant forwarding components. In some implementations, one or more process blocks of FIG. 5 may be performed by a network device (e.g., network device 220). In some implementations, one or more process blocks of FIG. 5 may be performed by another device or a group of devices separate from or including the device, such as an endpoint device (e.g., endpoint device 210). Additionally, or alternatively, one or more process blocks of FIG. 5 may be performed by one or more components of device 300, such as processor 320, memory 330, storage component 340, input component 350, output component 360, and/or communication component 370. Additionally, or alternatively, one or more process blocks of FIG. 5 may be performed by one or more components of device 400, such as input component 410, switching component 420, output component 430, and/or controller 440.

As shown in FIG. 5, process 500 may include receiving one or more packets (block 510). For example, the network device may receive one or more packets, as described above. In some implementations, the network device includes a first routing component, a second routing component, a first forwarding component, a second forwarding component, and a flexible physical interface card concentrator (e.g., a physical interface card concentrator) with multiple physical interface cards.

As further shown in FIG. 5, process 500 may include providing, to the physical interface card concentrator, a signal indicating that the second forwarding component is to be an active forwarding component (block 520). For example, the network device may provide, by the first routing component and to the physical interface card concentrator, a signal indicating that the second forwarding component is to be an active forwarding component, as described above.

As further shown in FIG. 5, process 500 may include causing, based on the signal, a data path for the multiple physical interface cards to be switched from the first forwarding component to the second forwarding component (block 530). For example, the network device may cause, by the physical interface card concentrator and based on the signal, a data path for the multiple physical interface cards to be switched from the first forwarding component to the second forwarding component, as described above.

As further shown in FIG. 5, process 500 may include providing the one or more packets to the second forwarding component (block 540). For example, the network device may provide, by the first routing component, the one or more packets to the second forwarding component, as described above.

As further shown in FIG. 5, process 500 may include providing the one or more packets to the multiple physical interface cards of the physical interface card concentrator via the data path (block 550). For example, the network device may provide, by the second forwarding component, the one or more packets to the multiple physical interface cards of the physical interface card concentrator via the data path, as described above.

As further shown in FIG. 5, process 500 may include forwarding the one or more packets toward one or more destinations associated with the one or more packets (block 560). For example, the network device may forward, by the multiple physical interface cards, the one or more packets toward one or more destinations associated with the one or more packets, as described above.

Process 500 may include additional implementations, such as any single implementation or any combination of implementations described below and/or in connection with one or more other processes described elsewhere herein.

In a first implementation, providing, by the first routing component and to the physical interface card concentrator, the signal indicating that the second forwarding component is to be the active forwarding component includes providing, by a control unit of the first routing component and to another control unit of the physical interface card concentrator, the signal indicating that the second forwarding component is to be the active forwarding component.

In a second implementation, alone or in combination with the first implementation, causing, by the physical interface card concentrator and based on the signal, the data path for the multiple physical interface cards to be switched from the first forwarding component to the second forwarding component includes causing, by a control unit of the physical interface card concentrator, the multiple physical interface cards to terminate the data path with the first forwarding component based on the signal, and causing, by the control unit of the physical interface card concentrator, the multiple physical interface cards to establish the data path with the second forwarding component based on the signal.

In a third implementation, alone or in combination with one or more of the first and second implementations, the network device includes a plurality of physical interface card concentrators, and the physical interface card concentrator is one of the plurality of physical interface card concentrators.

In a fourth implementation, alone or in combination with one or more of the first through third implementations, process 500 includes providing, by the second routing component and to the physical interface card concentrator, another signal indicating that the second routing component is to be an active routing component, wherein the other signal is provided by the second routing component, rather than the first routing component, to the physical interface card concentrator, and wherein the one or more packets are provided by the second routing component, rather than the first routing component, to the multiple physical interface cards.

In a fifth implementation, alone or in combination with one or more of the first through fourth implementations, process 500 includes receiving, by the first routing component, an indication of a failure associated with the first forwarding component, and generating the signal indicating that the second forwarding component is to be the active forwarding component based on the indication of the failure associated with the first forwarding component.

In a sixth implementation, alone or in combination with one or more of the first through fifth implementations, the first routing component is an active routing component of the network device, and the second routing component is a backup routing component of the network device.

In a seventh implementation, alone or in combination with one or more of the first through sixth implementations, the first forwarding component is the active forwarding component of the network device prior to the first forwarding component providing the signal to the physical interface card concentrator, and the second forwarding component is a backup forwarding component of the network device prior to the first forwarding component providing the signal to the physical interface card concentrator.

In an eighth implementation, alone or in combination with one or more of the first through seventh implementations, the data path for the multiple physical interface cards is switched from the first forwarding component to the second forwarding component in less than one millisecond. The network device includes traffic flowing between the second forwarding component, the multiple physical interface cards, and one or more ports of the network device In a ninth implementation, alone or in combination with one or more of the first through eighth implementations, the signal further indicates that the first routing component is an active routing component of the network device, and that the second routing component is a backup routing component of the network device.

In a tenth implementation, alone or in combination with one or more of the first through ninth implementations, process 500 includes receiving, by the second forwarding component, one or more additional packets; providing, by the second forwarding component, the one or more additional packets to the multiple physical interface cards; and providing, by the multiple physical interface cards, the one or more additional packets to the first routing component.

In an eleventh implementation, alone or in combination with one or more of the first through tenth implementations, process 500 includes providing, to each of the multiple physical interface cards, a switch signal indicating that the data path for the multiple physical interface cards is to be switched from the first forwarding component to the second forwarding component; and causing the data path for the multiple physical interface cards to be switched from the first forwarding component to the second forwarding component based on the switch signal.

In a twelfth implementation, alone or in combination with one or more of the first through eleventh implementations, the network device includes a plurality of flexible physical interface card concentrators, and the flexible physical interface card concentrator is one of the plurality of flexible physical interface card concentrators.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a network device, one or more packets,
        wherein the network device includes a first routing component, a second routing component, a first forwarding component, a second forwarding component, and a physical interface card concentrator with multiple physical interface cards;
    causing, by a control unit of the physical interface card concentrator, each of the multiple physical interface cards to establish a data path with the first forwarding component;
    providing, by the first routing component and to the control unit of the physical interface card concentrator, a signal indicating that the second forwarding component is to be an active forwarding component,
        wherein the active forwarding component is configured to forward traffic to the physical interface card concentrator;
    causing, by the control unit of the physical interface card concentrator and based on the signal, the data path for each of the multiple physical interface cards to be simultaneously switched from being between the first forwarding component and the multiple physical interface cards to being between the second forwarding component and the multiple physical interface cards,
        wherein the multiple physical interface cards are communicating with the second forwarding component instead of with the first forwarding component;
    providing, by the first routing component, the one or more packets to the second forwarding component;
    providing, by the second forwarding component, the one or more packets to the multiple physical interface cards via the data path; and
    forwarding, by the multiple physical interface cards, the one or more packets toward one or more destinations associated with the one or more packets.

2. The method of claim 1, wherein providing, by the first routing component and to the physical interface card concentrator, the signal indicating that the second forwarding component is to be the active forwarding component comprises:
    providing, by the control unit of the first routing component and to another control unit of the physical interface card concentrator, the signal indicating that the second forwarding component is to be the active forwarding component.

3. The method of claim 1, wherein causing, by the physical interface card concentrator and based on the signal, the data path for the multiple physical interface cards to be switched from the first forwarding component to the second forwarding component comprises:
    causing, by the control unit of the physical interface card concentrator, the multiple physical interface cards to terminate the data path with the first forwarding component based on the signal; and
    causing, by the control unit of the physical interface card concentrator, the multiple physical interface cards to establish the data path with the second forwarding component based on the signal.

4. The method of claim 1, wherein the network device includes a plurality of physical interface card concentrators, and the physical interface card concentrator is one of the plurality of physical interface card concentrators.

5. The method of claim 1, further comprising:
    providing, by the second routing component and to the physical interface card concentrator, another signal indicating that the second routing component is to be an active routing component,
        wherein the other signal is provided by the second routing component, rather than the first routing component, to the physical interface card concentrator, and wherein the one or more packets are provided by the second routing component, rather than the first routing component, to the multiple physical interface cards.

6. The method of claim 1, further comprising:
receiving, by the first routing component, an indication of a failure associated with the first forwarding component; and
generating the signal indicating that the second forwarding component is to be the active forwarding component based on the indication of the failure associated with the first forwarding component.

7. The method of claim 1, wherein the first routing component is an active routing component of the network device, and
wherein the second routing component is a backup routing component of the network device.

8. A network device, comprising:
a first routing component;
a second routing component;
a first forwarding component;
a second forwarding component; and
a physical interface card concentrator with multiple physical interface cards,
wherein the first routing component is configured to:
provide, to the physical interface card concentrator, a signal indicating that the second forwarding component is to be an active forwarding component, and
provide one or more packets to the second forwarding component, wherein the physical interface card concentrator is configured to:
cause, by a control unit of the physical interface card concentrator, each of the multiple physical interface cards to establish a data path with the first forwarding component,
wherein the active forwarding component is configured to forward traffic to the physical interface care concentrator; and
cause, by the control unit of the physical interface card concentrator and based on the signal, the data path for each of the multiple physical interface cards to be simultaneously switched from being between the first forwarding component and the multiple physical interface cards to being between the second forwarding component and the multiple physical interface cards,
wherein the multiple physical interface cards are communicating with the second forwarding component instead of with the first forwarding component; wherein the second forwarding component is configured to:
provide the one or more packets to the multiple physical interface cards via the data path, and
wherein the multiple physical interface cards are configured to:
forward the one or more packets toward one or more destinations associated with the one or more packets.

9. The network device of claim 8, wherein the first forwarding component is an active forwarding component of the network device prior to the first forwarding component providing the signal to the physical interface card concentrator, and
wherein the second forwarding component is a backup forwarding component of the network device prior to the first forwarding component providing the signal to the physical interface card concentrator.

10. The network device of claim 8, wherein the data path for the multiple physical interface cards is switched from the first forwarding component to the second forwarding component in less than one millisecond; and
wherein the network device includes traffic flowing between the second forwarding component, the multiple physical interface cards, and one or more ports of the network device.

11. The network device of claim 8, wherein the signal further indicates that the first routing component is an active routing component of the network device, and that the second routing component is a backup routing component of the network device.

12. The network device of claim 8, wherein the multiple physical interface cards are further configured to:
receive one or more additional packets;
provide the one or more additional packets to the second forwarding component; and
wherein the second forwarding component is further configured to:
provide the one or more additional packets to the first routing component.

13. The network device of claim 8, wherein the physical interface card concentrator, when causing, based on the signal, the data path for the multiple physical interface cards to be switched from the first forwarding component to the second forwarding component, is configured to:
provide, to each of the multiple physical interface cards, a switch signal indicating that the data path for the multiple physical interface cards is to be switched from the first forwarding component to the second forwarding component; and
cause the data path for the multiple physical interface cards to be switched from the first forwarding component to the second forwarding component based on the switch signal.

14. The network device of claim 8, wherein the network device includes a plurality of physical interface card concentrators, and the physical interface card concentrator is one of the plurality of physical interface card concentrators.

15. A system comprising:
a first routing component;
a second routing component;
a first forwarding component;
a second forwarding component; and
a physical interface card concentrator with a plurality of physical interface cards,
wherein the physical interface card concentrator is configured to:
cause, by a control unit of the physical interface card concentrator, each of the plurality of physical interface cards to establish a data path with the first forwarding component;
wherein the first routing component is configured to:
provide a signal indicating that the second forwarding component is to be an active forwarding component,
wherein the active forwarding component is configured to forward traffic to the physical interface card concentrator,
wherein, based on the signal, the data path for each of the physical interface cards is simultaneously switched from being between the first forwarding component and the plurality of physical interface cards to being between the second forwarding component and the plurality of physical interface cards, and wherein the physical interface cards are communicating with the second forwarding component instead of with the first forwarding component; and provide one or more packets to the second forwarding component, wherein the second forwarding component is configured to:

provide the one or more packets to the physical interface cards via the data path; and wherein the plurality of physical interface cards are configured to:

forward the one or more packets toward one or more destinations associated with the one or more packets, receive one or more additional packets, and provide the one or more additional packets to the second forwarding component to cause the second forwarding component to provide the one or more additional packets to the first routing component.

16. The system of claim 15, wherein the plurality of physical interface cards are further configured to:

terminate the data path with the first forwarding component when the signal indicates that the first forwarding component is experiencing a failure.

17. The system of claim 15, wherein the second routing component is further configured to:

provide another signal indicating that the second routing component is to be an active routing component, wherein the other signal causes a simultaneous switchover from the first routing component to the second routing component and from the first forwarding component to the second forwarding component;

provide packets to the second forwarding component; and wherein the second routing component is configured to:

provide the packets to the physical interface cards for forwarding toward a destination of the packets.

18. The system of claim 15, wherein the first routing component is configured to:

receive an indication of a failure associated with the first forwarding component; and generate the signal indicating that the second forwarding component is to be the active forwarding component based on the indication of the failure associated with the first forwarding component.

19. The system of claim 15, wherein the data path for the plurality of physical interface cards is switched from the first forwarding component to the second forwarding component in less than one millisecond.

20. The system of claim 15, wherein the signal further indicates that the first routing component is an active routing component, indicates that the second routing component is a backup routing component, indicates a failure of the second forwarding component, indicates a health status of the second forwarding component, indicates a state of the second forwarding component, indicates a temperature of the second forwarding component, and/or indicates a power status of the second forwarding component.

* * * * *